US008582558B2

(12) United States Patent
Sakai

(10) Patent No.: US 8,582,558 B2
(45) Date of Patent: Nov. 12, 2013

(54) IP TELEPHONE SYSTEM

(75) Inventor: Shizuma Sakai, Hino (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1362 days.

(21) Appl. No.: 11/724,246

(22) Filed: Mar. 15, 2007

(65) Prior Publication Data

US 2007/0263614 A1 Nov. 15, 2007

(30) Foreign Application Priority Data

Mar. 30, 2006 (JP) ................................. 2006-095241

(51) Int. Cl.
*H04L 12/66* (2006.01)
*H04M 3/00* (2006.01)
*G06F 9/44* (2006.01)

(52) U.S. Cl.
USPC ............................ 370/352; 455/418; 717/168

(58) Field of Classification Search
USPC .......................... 717/168–173; 370/352–356; 455/418–419
See application file for complete search history.

(56) References Cited

U.S. PATENT DOCUMENTS

| | | | | |
|---|---|---|---|---|
| 2004/0146048 | A1* | 7/2004 | Cotte | 370/352 |
| 2004/0152455 | A1* | 8/2004 | Herle | 455/418 |
| 2004/0187103 | A1* | 9/2004 | Wickham et al. | 717/168 |
| 2006/0046717 | A1* | 3/2006 | Bovell et al. | 455/432.3 |
| 2006/0159100 | A1* | 7/2006 | Droms et al. | 370/395.2 |

FOREIGN PATENT DOCUMENTS

| | | |
|---|---|---|
| EP | 1 635 256 A1 | 3/2006 |
| EP | 1 906 636 A1 | 4/2008 |
| JP | 2000-23209 | 1/2000 |
| JP | 2000-194541 | 7/2000 |
| JP | 2004-72532 | 3/2004 |
| JP | 2004-133594 | 4/2004 |
| JP | 2004-164115 | 6/2004 |
| JP | 2005-26993 | 1/2005 |
| JP | 2005-228289 | 8/2005 |
| JP | 2005-352946 | 12/2005 |
| JP | 2006-157524 | 6/2006 |
| KR | 2003-0005466 | 1/2003 |

(Continued)

OTHER PUBLICATIONS

Search Report issued by the United Kingdom Intellectual Property Office on Feb. 19, 2009, in corresponding British Application No. GB0900992.9.

(Continued)

*Primary Examiner* — Asad Nawaz
*Assistant Examiner* — Joel Hamel
(74) *Attorney, Agent, or Firm* — Finnegan, Henderson, Farabow, Garrett & Dunner, LLP

(57) ABSTRACT

An IP telephone system equipped with a plurality of telephone terminals and a file server, wherein the file server comprises notification unit notifies an occurrence of update data of the software to the telephone terminals and transfer unit transfers the update data to a telephone terminal of a request source in response to a request from the update data from the telephone terminal, and the telephone terminal comprises reporting unit reports a fact of such to user when the occurrence of the update data is notified from the file server, a input unit used for inputting the update timing of the software by the user reported, request unit requests a transfer of the update data to the file server at the timing, and software update unit switches old software to new software based on the update data transferred from the file server in response to the request.

3 Claims, 7 Drawing Sheets

System manager
FTP server 11
IP telephone set 12
User
Update telephone set software
S1
Notify software update
S2
S3
Display message inducing update
S12
Absence
No
S9
Time specification is input?
No
S10
Fixed time period elapsed?
Yes
Yes
Set update time
S11
Request download
Confirm elapse of update time
S5
S6
Download software
S8
S7
Switch software

(56) References Cited

FOREIGN PATENT DOCUMENTS

| | | | |
|---|---|---|---|
| KR | 10-2005-0022717 | | 3/2005 |
| WO | WO 2006/002750 | A1 | 1/2006 |
| WO | WO 2006/110991 | A1 | 10/2006 |

OTHER PUBLICATIONS

Decision of Rejection issued by the Japanese Patent Office on Apr. 10, 2009, for Japanese Patent Application No. 2006-095241, and English-language translation thereof.

Notification of Reasons for Rejection issued by the Japanese Patent Office on Jul. 11, 2008, for Japanese Patent Application No. 2006-095241, and English-language translation thereof.

Combined Search and Examination Report issued by the U.K. Intellectual Property Office on Jul. 2, 2007, for British Application No. GB0705022.2.

* cited by examiner

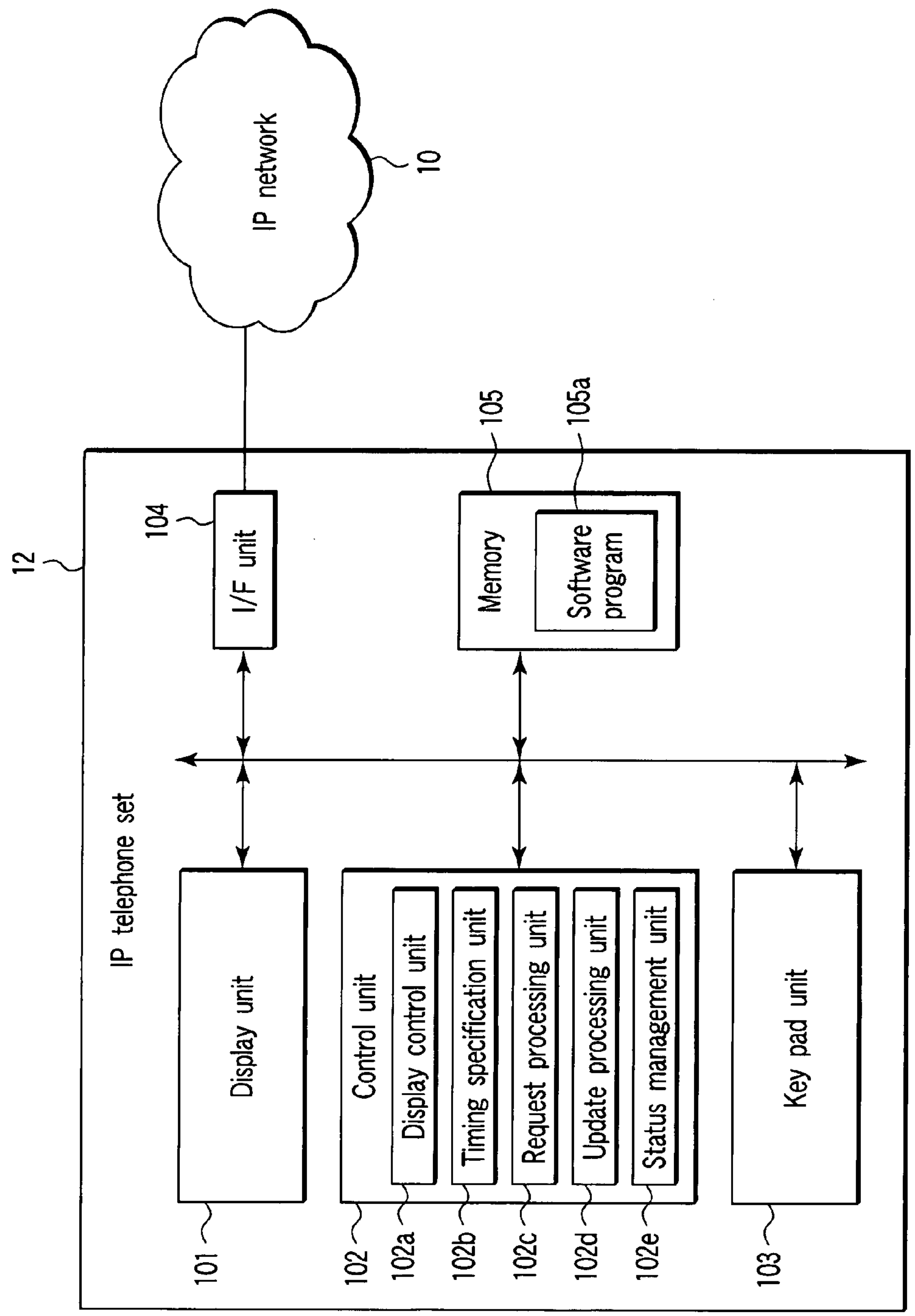
F I G. 2

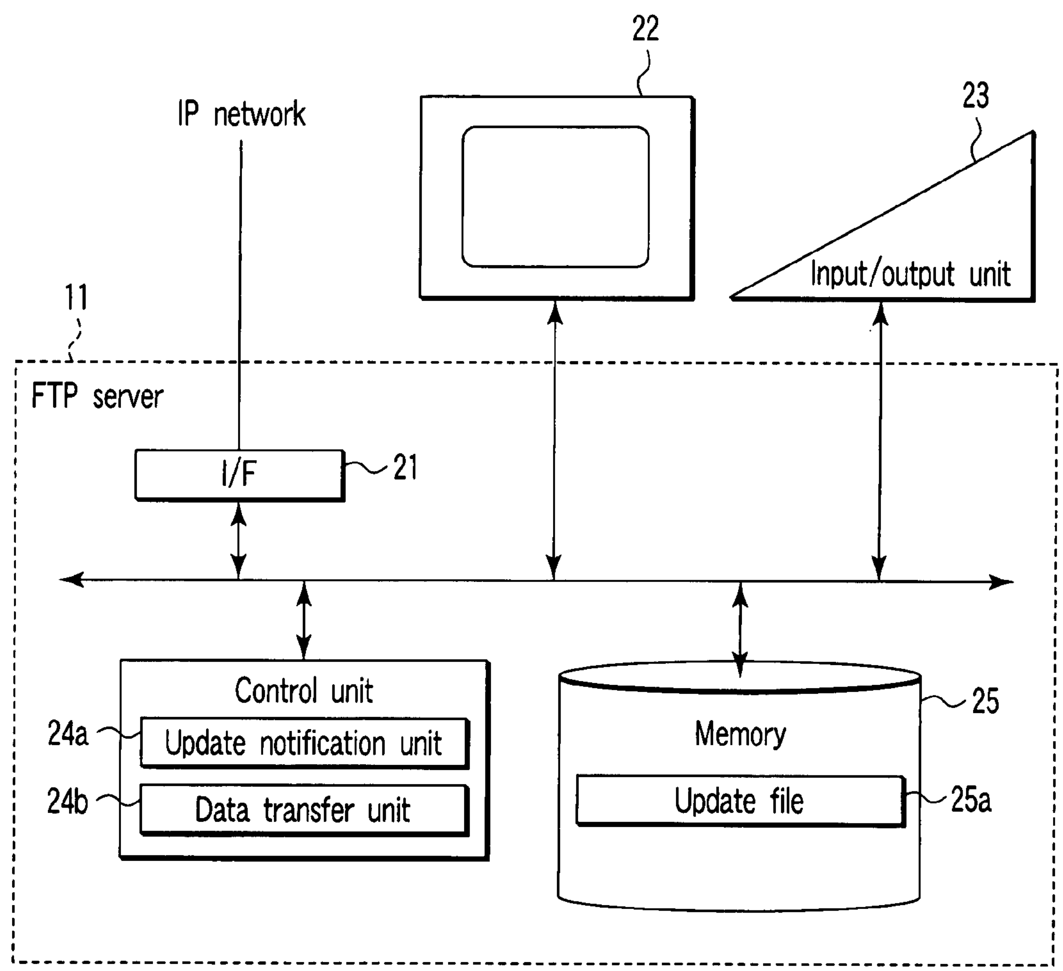
F I G. 3

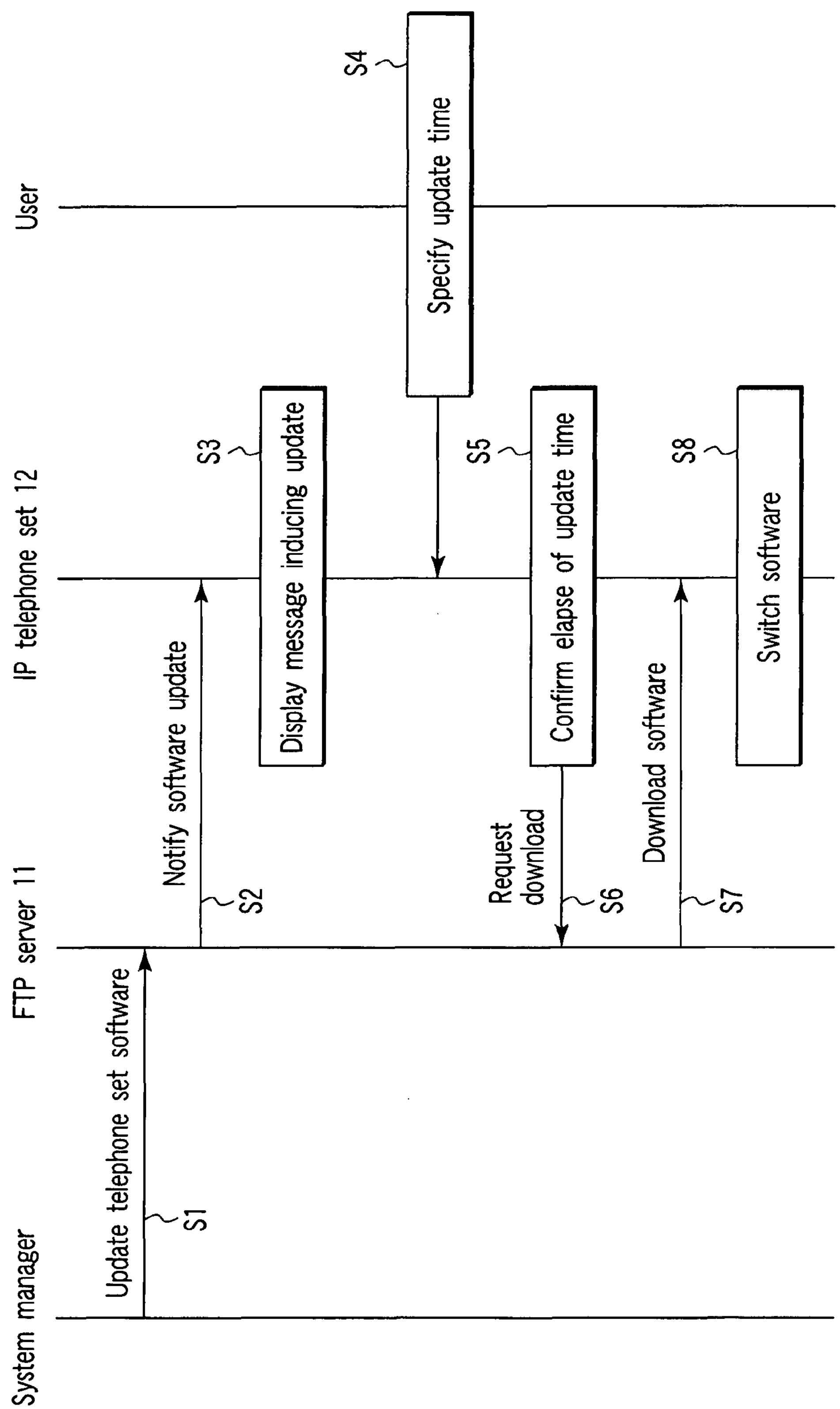
F I G. 4

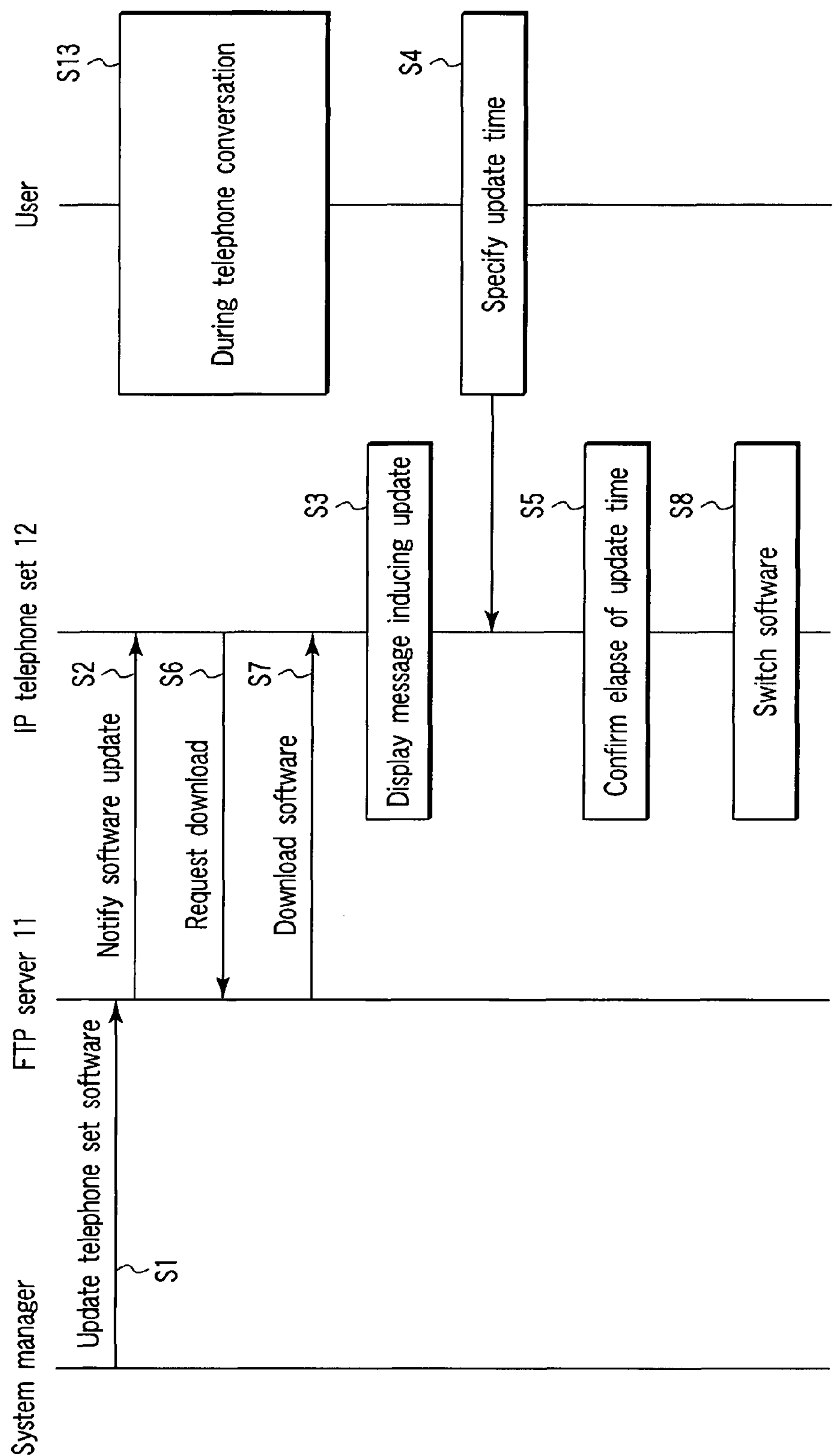
F I G. 6

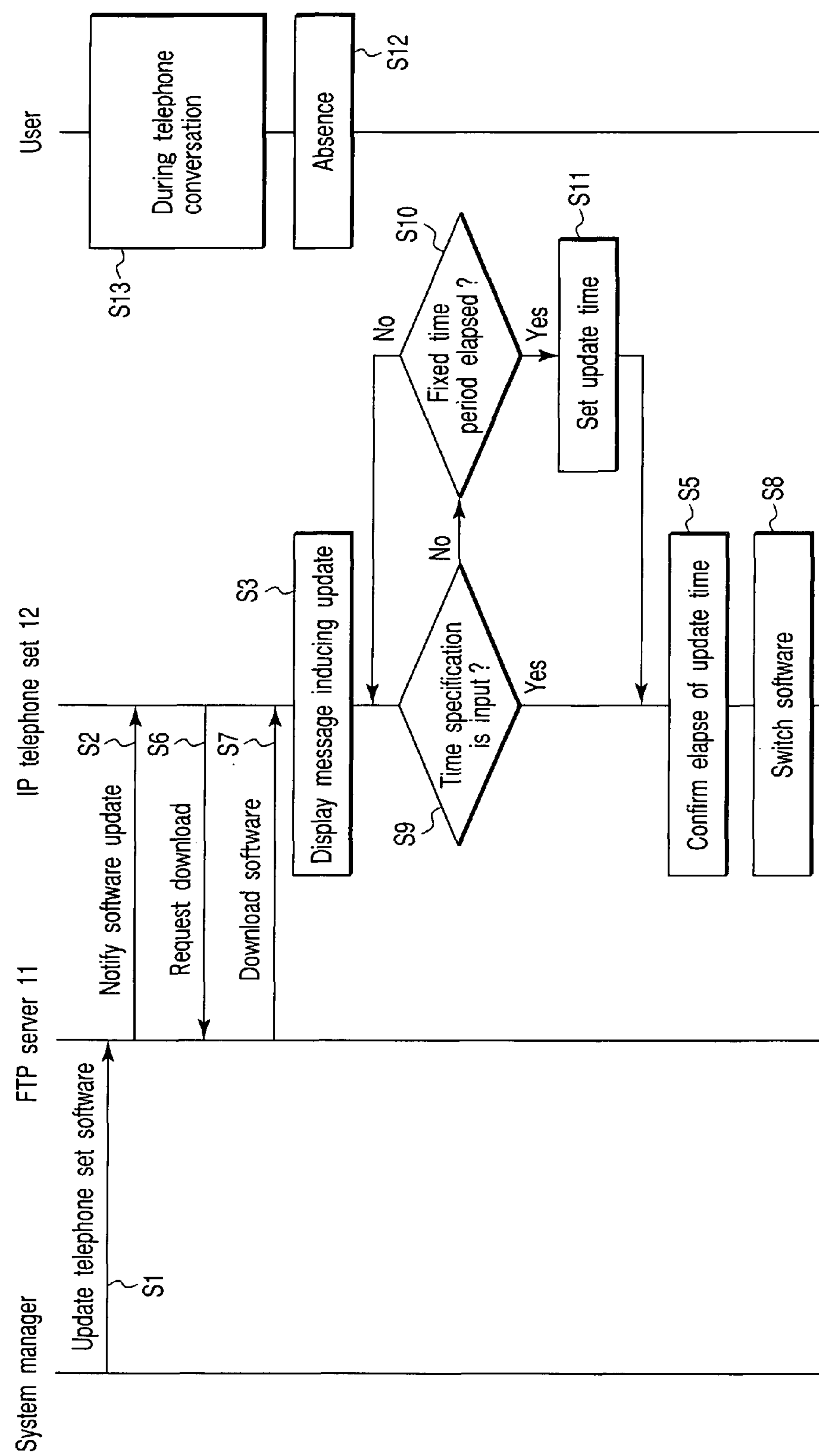
F I G. 7

IP TELEPHONE SYSTEM

CROSS-REFERENCE TO RELATED APPLICATIONS

This application is based upon and claims the benefit of priority from prior Japanese Patent Application No. 2006-095241, filed Mar. 30, 2006, the entire contents of which are incorporated herein by reference.

BACKGROUND OF THE INVENTION

1. Field of the Invention

The present invention relates to an Internet Protocol (IP) telephone system using an IP network.

2. Description of the Related Art

A system for communicating voice information by using a best-effort type communication network, such as an IP network, has been widely introduced. Such a type of system is called an IP telephone system or a voice over Internet protocol (VoIP), and the system has firstly been used for an extension telephone system in an office, and it has begun to be applied to a wide area telephone network as well.

As for a terminal to be used for the IP telephone system (hereinafter, referred to as IP telephone set), there exists a personal computer (so-called soft phone) with software installed therein, and a telephone set developed specially for the IP telephone system. In recent years, a technique, by which a telephone set is provided with a rewritable memory, and a system program is downloaded in the memory to change or update the function of the telephone set, has been proposed (for example, Jpn. Pat. Appln. KOKAI Publication No. 2004-72532).

As to one method for rewriting the software in the memory of the telephone set, directly transferring data for update to the telephone set from a server, and immediately updating the software at the IP telephone set on a reception side is a possible method. However, takes a fixed time to update the software, and it results in stoppage of a telephone service. Therefore, a conflict between timing at which a user expects to use the IP telephone set and timing at which the software to be updated poses such a problem that the user temporarily becomes to be disabled to enjoy the telephone service.

BRIEF SUMMARY OF THE INVENTION

An object of the present invention is to provide an IP telephone system capable of updating software stored in an IP telephone set without having to stop a service.

According to an aspect of the present invention, there is provided an Internet Protocol (IP) telephone system equipped with a plurality of telephone terminals connected to an IP network and equipped with a file server for transferring software to be used in the telephone terminals to the plurality of telephone terminals via the IP network, wherein the file server comprises: an update notification unit which notifies an occurrence of update data of the software to the telephone terminals; and a data transfer unit which transfers the update data to a telephone terminal of a request source in response to a request from the update data from the telephone terminal, and the telephone terminal comprises: a reporting unit which reports a fact of such to a user when the occurrence of the update data is notified from the file server; a timing input unit which is used for inputting the update timing of the software by the user who has been reported; a request unit which requests a transfer of the update data to the file server at the timing; and a software update unit which switches software being used at present to software based on the update data transferred from the file server in response to the request.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exemplary functional block diagram of an IP telephone terminal 12 in FIG. 1;

FIG. 3 is an exemplary functional block diagram of a file transfer protocol (FTP) server 11 in FIG. 1;

FIG. 4 is an exemplary sequence view of a software update in a first embodiment of the invention;

FIG. 6 is an exemplary sequence view of a software update in a second embodiment of the invention; and FIG. 7 is an exemplary sequence view of a software update in the case where there is no input from the user in the second embodiment.

DETAILED DESCRIPTION OF THE INVENTION

First Embodiment

Figure 1:
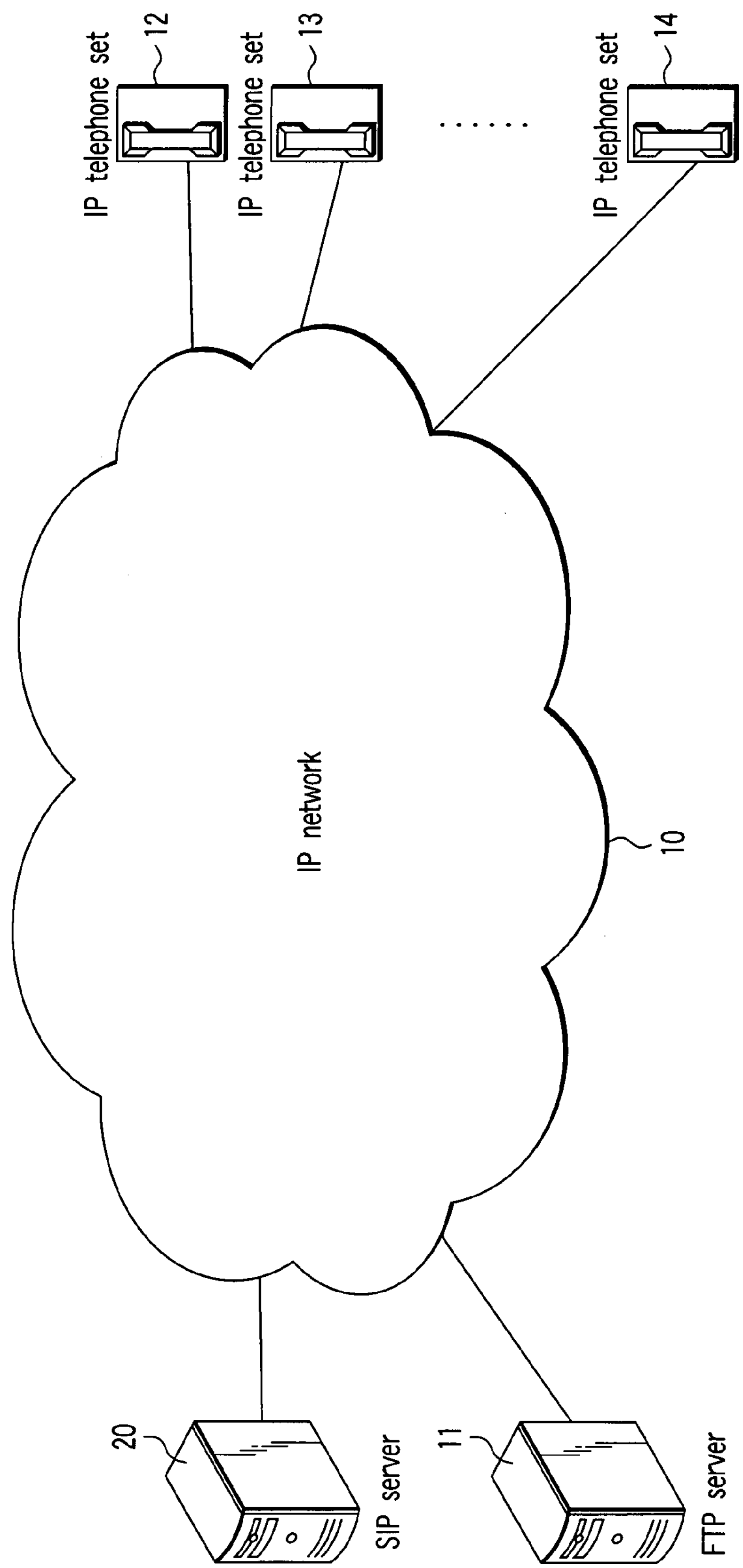
FIG. 1 is an exemplary system view illustrating an embodiment of a telephone system related to the invention.

FIG. 1 is a system view depicting an embodiment of a telephone system related to the present invention. IP telephone sets 12 to 14, and besides them, a plurality of IP telephone sets (not shown) are connected to an IP network 10. A file transfer protocol (FTP) server 11 and a session initiated protocol (SIP) server 20 are connected to the IP network 10. The FTP server 11 is a server to perform a file transfer. The SIP server 20 controls calls among the IP telephone sets on the basis of an SIP procedure.

FIG. 2 depicts a functional block diagram of the IP telephone terminal 12 in FIG. 1. The IP telephone sets 13 and 14 are also have the same configurations as that of the IP telephone set 12. The IP telephone set 12 comprises an interface (I/F) unit 104, a display unit 101, a control unit 102, a key pad unit 103, and a memory 105. The control unit 102 includes a display control unit 102*a*. The I/F unit 104 conducts interface processing in regard to a packet transmission/reception to/from the IP network 10. The display unit 101 is a liquid crystal display, and it displays a character message though the control by the display control unit 102*a*. The key pad unit 103 has function keys and numeric keys, etc., to accept a variety of operations from a user including a login operation and a phone number input. The memory 105 stores a software program 105*a* regarding various types of operation control of the IP telephone terminal 12.

The control unit 12 comprises the display control unit 102*a*, a timing specification unit 102*b*, a request processing unit 102*c*, an update processing unit 102*d*, and a status management unit 102*e*.

When being notified the fact that the update data for the software program 105*a* is present, in other words, when receiving a message inducing the update of the software, the display control unit 102*a* displays the fact onto the display unit 101 to notify it to the user. The timing notification unit 102*b* is a user interface to be used for inputting the update timing of the software program 105*a* by the user who has found the display on the display unit 101.

At the timing specified by the user, the request processing unit 102*c* requests the transfer of the update data to the FTP server 11. The update processing unit 102*d* switches the software with an old version to that with a new version on the basis of the update data downloaded from the FTP server 11 to update the software of the IP telephone set 12.

The status management unit 102*e* manages the user status including login/logout information of the user of the IP telephone set 12, and presence information indicating the presence/absence of the user.

FIG. 3 is a functional block diagram of the FTP server 11 of FIG. 1. In FIG. 3, the FTP server 11 comprises an interface unit (I/F) 21 connected to the IP network 10, a display unit 22, an input/output unit 23, a control unit 24, and a storage unit 25. Among of them, the storage unit 25 stores an update file 25*a* for the data to update the software program 105*a* of the IP telephone set 12 into a dedicated storage area.

In FIG. 3, the control unit 24 includes an update notification unit 24*a* and a data transfer unit 24*b* as a processing function regarding the present invention. The update notification unit 24*a* notifies the fact when a new update file 25*a* is generated (or prepared). The data transfer unit 24*b* transfers the update file 25*a* to the IP telephone set 12 of a request source in response to the download request from the IP telephone set 12.

Next to this, a procedure to update each IP telephone set will be described.

FIG. 4 is a sequence view depicting a procedure in updating software. A system manager prepares a file for an update to transfer it to the FTP server 11. Thereby, the fact of the update of the file (software) is notified to the FTP server 11 (step S1). In this procedure, the system manager logs in the FTP server 11 from another PC terminal by using the known inter-computer communication and up loads the file for the update into the FTP server 11. Or, the system manager may update the file by directly operating an application management for file version of the FTP server 11.

After this, the FTP server 11 concurrently notifies the fact of the update of the software to each IP telephone set besides the IP telephone set 12 (step S2). In this procedure, the known procedure, such as broadcasting of a multi-address packet may be usable.

Upon receiving this notification, the IP telephone set 12 displays the fact that it has already received the message inducing the update of the software indicating "At how many minutes after the present time, the software will be updated?" (step S3). Thereby, the user of the IP telephone set 12 is induced to input the update timing. If the user is during telephone conversation, namely the user is busy, at that moment, the information on a telephone conversation time and a telephone conversation destination having been displayed on the display unit 101, in such a case, the message inducing the update is not displayed. After terminating the telephone conversation, the message is displayed thereon.

The user input, for example, after "thirty" minutes, as an update time in accordance with the display screen (step S4). To specify the update timing, the user may directly input though the ten keys at the key pad unit 103, or also may employs such a method for pressing alternative numbers displayed on the display unit 101. The IP telephone set 12 stores the update timing in the memory 105, and when the update timing arrives (step S5), the IP telephone set 12 requests the download of the file to the FTP server 11 (step S6). The software for update is then downloaded from the FTP server 11 to the IP telephone set 12 (step S7), and stored in the memory 105.

After terminating the download, the IP telephone set 12 switches the software. That is, the control middleware owned by the telephone set 12 makes the downloaded difference file match to the software being executed at present time, and after rewriting the software to store it in the memory 105, it restarts the IP telephone set 12. Thus, new software is installed and the update processing of the software is completed (step S8).

In the procedure in FIG. 4, each user may arbitrarily specify the update timing of the software. In other words, each user specifying the time when it does not need any telephone service (for instance, after terminating business hour) makes it possible to avoid unexpected stoppage of the telephone service.

Such a case, in which the software is not updated although the user does not use its telephone set because of user's absence, is rather inconvenient for the user. To avoid this inconvenience, if the user does not specify the time for the update after the notification of the update of the software, the display on the display unit 101 may be disappeared after the elapse of a fixed time period, and may immediately download the file and switch the software.

Figure 5:
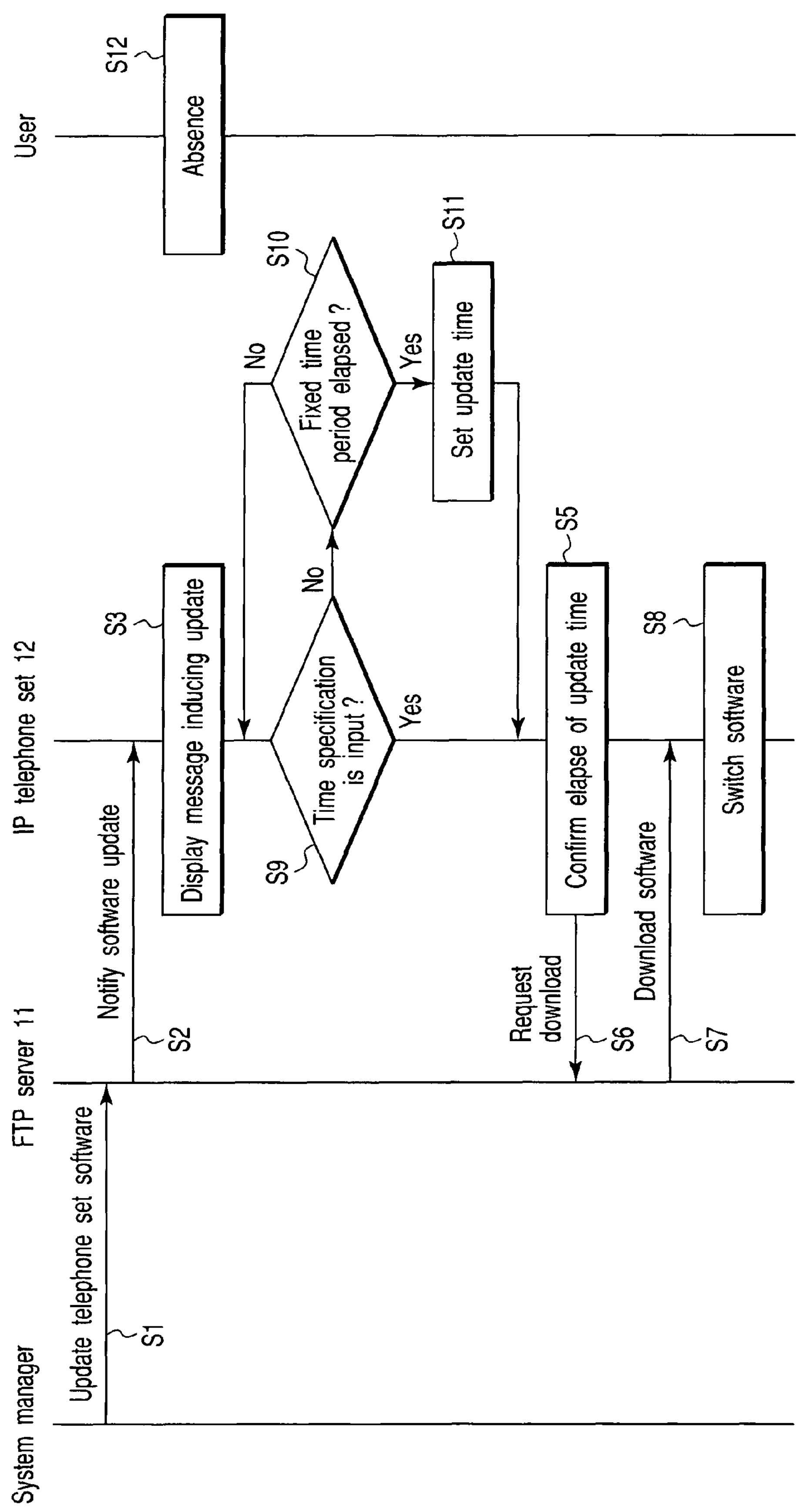
FIG. 5 is an exemplary sequence view of a software update in the case where there is no input from a user in the first embodiment.

FIG. 5 is a sequence view depicting a procedure in the case that there is no time specification by the user in the first embodiment. In FIG. 5, a processing loop in steps S9 and S10 and a step S11 are different form the rest. In the step S3, it is presumed that after the message inducing the user to specify the time is displayed, the user does not conduct an input operation (No, in step S9) because the user is absent (step S12). If a fixed time period (for example, one hour) has elapsed in leaving such a state (Yes, in step S10), a step S11 forces to set the telephone system to update the software to "0" minute after the present time.

The IP telephone set 12 then immediately requests the download of the file to the FTP server 11, then, downloads the file and switches the software. The defied time to be used in the step S10 may be given from the telephone system on starting up the IP telephone set 12, or may be directly input or set to each IP telephone set by each user, respectively.

Second Embodiment

FIG. 6 is a sequence view depicting a procedure in updating the software in a second embodiment of the invention. In a step S2, upon receiving a file update notification from the FTP server 11, the IP telephone set 12 immediately requests the download of the file to the FTP server 12 regardless of the reception timing then the file of the software is downloaded. At this moment, it is supposed that the user during telephone conversation (step S13). Regardless of this, only the download of the file is performed while the telephone service being kept.

In the foregoing procedure, it is needed for an IP communication that is the base of the telephone service not to be affected by the procedure given above. Therefore, in the second embodiment, the priority that is higher than that of the file transfer processing is given to the telephone service. More specifically, the Quality of Service (QoS) is set to the IP telephone protocol (SIP, RTP, RTCP. etc.) for the telephone service. Then, the priority lower than those of these protocols is given to the FTP that is one to be used for the download of the file.

To implement the QoS to the telephone system, if the IPv4 is used for the system, the priority is written into the IPv4 Type of Service (TOS) of an UDP port, or TCP port. Or, the priority is written into the Priority Bit of VLAN TAG. The term "VLAN" means a virtual LAN (Local Area Network).

Or, the priority is monitored in real time by payload identification. If the IPv6 is used for the system, the system uses a traffic class and a flow for each protocol set to a packet header and an expansion header.

After completing the down load, the display unit 101 displays the message inducing the user to input the update timing (step S3). If the user is during the telephone conversation (step S13), the display unit 101 displays it after terminating the telephone conversation. When the user inputs the update timing in accordance with the message (step S4), the IP telephone set 12 stores the timing in the memory 105. When the specified timing arrives (step S5), the telephone set 12 automatically switches the software (step S8).

Also in the second embodiment, the user may arbitrarily specify the update timing of the software. Therefore, specifying the time not necessary to enjoy the telephone service as the update timing makes it possible to avoid any telephone service not expected by the user. The advantages given form the second embodiment are that the system may effectively utilize the resource of communication and may utilize the updated telephone set for a shorter time after the specified timing, in comparison to the first embodiment. These advantages are resulted from the separated implementation of the download and the update of the software. That is to say, because, at the time when the update of software is started, the software has already been downloaded and the time of minutes to be taken to download the software can be reduced.

If the user has not specified the time because of its being absent, the IP telephone set 12 may stop the display on the display unit 101 after the elapse of the defined time period and immediately switch the software.

FIG. 7 is a sequence view in the case in which the user has not specified the time in the second embodiment. On the loop of the steps S9 and S10, if there is no specifying of the update time within a fixed time period, the step S11 forces to set the update time to "00" minutes after the present time. The IP telephone set 12 immediately switches the software in response to this setting.

Third Embodiment

In a third embodiment of the invention, an IP telephone system utilizes status information indicating the login/logout of a user, and presence information of the user to set the update timing of the software. The IP telephone system usually uses both the status information and the presence information.

In the IP telephone system, the user logs in the telephone system before using the IP telephone set (at the time of coming to office, etc.). Depressing a login button, or directly inputting a login code allows the IP telephone set to be brought into a state for receiving inputs of a login ID and a password. When the user input the login ID and the password, the IP telephone set transfers the foregoing information to the SIP server 20.

The SIP server 20 conducts authentication processing depending on the combination between the login ID and the password. The login ID and the password to be used for the authentication are recorded in a user management table of the SIP server 20. When the login is completed successfully, the SIP server 20 defines the login information of the user to "login", and defines the presence information to "presence" to record the information in the user management table. The result of success or failure of the login is returned to the IP telephone set of a login request source. When the user logs out, the SIP server 20 authenticates the login ID again. The login information and the presence information of the user are deleted from the user management table.

When the user during login operates (depresses button "absence", etc.) the presence information through the IP telephone set, the IP telephone set records the presence information to transfer the operation result to the SIP server 20. The SIP server 20 defines the presence information of the user at the operation source to "absence" to update the user management table.

The IP telephone set has been grasping the status of the user by itself on the basis of the result of the success or failure of the login notified from the SIP server 20 and on the basis of the operation record on the side of the IP telephone set 12 without having to refer the user management table. The IP telephone set may refer to the user management table if necessary (when it detected the update of the software, etc.).

In the third embodiment, a procedure in updating the software, when the user of the IP telephone set 12 logs in, but it is "absence", will be described. When the update of the software is notified from the FTP server 11, the IP telephone set 12 updates the software, based on the login information and the presence information owned by it. That is, the IP telephone set 12 which has received the file update notification requests the download to the FTP server 12 regardless of the timing of the reception of the notification, and firstly down loads the file.

After completing the download, the IP telephone set 12 refers to the login information and the presence information, and when the user is during login and absence, the IP telephone set 12 switches the software immediately. If the user is during login and absent, the IP telephone set 12 waits until the status of the user switches to logout or absence, and it switches the software after the status is switched.

In the case in which the user is during login and is absent, the IP telephone set 12 may display a message to induce an input of update timing onto the display unit 101 and makes the user input the update timing. When the update timing input by the user arrives, or when a fixed time period elapses without inputting the update timing by the user, the IP telephone set 12 switches the software. The IP telephone set 12 may be configured so that such setting can be appropriately changes, and the software thereof is witched immediately only when the status of the user is shows the logout of the user and the absence thereof.

In the procedure given above, the IP telephone set decides the timing to switch the software on the basis of the login information and the presence information. Other than this, the IP telephone set may decide the timing to perform the download request, based on the login information and the presence information. In other words, the IP telephone set 12, to which the update of its software has been notified, immediately requires the download of the file to the FTP server 11 when the user is during login and absent. If the user is during login and present, the IP telephone set 12 waits until the status changes to "logout" or to "absence", and after the status has been switched, the IP telephone set 12 requires the download to the FTP server 11.

In each embodiment mentioned above, when the IP telephone set is notified the update of the software from the FTP server 11, the IP telephone set immediately notifies the receiving of the inductive message of the update to the user. The IP telephone set 12 then downloads the software and updates the software after the arrival of the update time specified by the user. Thereby, the IP telephone set 12 becoming to possible to update the software at the time intended by the user, the IP telephone set may avoid unexpected stoppage of the telephone service.

In each of the embodiment, upon being notified the induction of the update of the software of the IP telephone set 12, it immediately downloads the software, after this, it notifies the execution of the update software to the user. Then, after waiting the arrival of the update time specified by the user, the IP telephone set 12 updates the software. Similarly, also in this manner, the user becomes possible to avoid the unexpected stoppage of the telephone service.

Further, after notifying the software update, if the update time has not been specified for a fixed time period, the IP telephone system determines that the user is absent and updates the software immediately. Thereby, the IP telephone system may avoid spending useless time.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An Internet Protocol (IP) telephone system comprising:

a plurality of telephone terminals connected to an IP network; and a file server for transferring software to the telephone terminals via the IP network, wherein the file server comprises:

an update notification module configured to notify an occurrence of update data of the software to the telephone terminals; and a data transfer module configured to transfer the update data to a telephone terminal in response to a request for the update data from at least one of the telephone terminals on the basis of a priority lower than that of the telephone service, and the at least one of the telephone terminal comprises:

a status management module configured to manage a user status including login/logout information of a user and presence information indicating presence/absence of the user;

a request module configured to request the file server to transfer the update data when the user is logged in and absent;

a reporting module configured to notify the user of the occurrence of the update data;

a timing input module configured to receive an update timing of the software from the user who is notified of the occurrence of the update data; and a software update module configured to switch software being used at present to software based on the update data transferred from the file server in response to the user status including the login/logout information and the presence information, wherein the request module is operable to send to the file server a request for transferring the update data at the update timing, and the request module forcibly sends the request to the file server after elapse of a fixed time when the update timing is not received.

2. The IP telephone system of claim 1, wherein the software update module switches the software at the update timing received from the user.

3. The IP telephone system of claim 2, wherein the software update module forcibly switches the software after elapse of a fixed time when the update timing is not received.

* * * * *